(12) United States Patent
McDonald

(10) Patent No.: US 8,579,186 B2
(45) Date of Patent: Nov. 12, 2013

(54) SYSTEM AND METHOD FOR TRACKING SHIPMENT OF ITEMS UTILIZING RFID-TAGS

(75) Inventor: Glenn E McDonald, Alexandria, VA (US)

(73) Assignee: United States Postal Service, Washington, DC (US)

( * ) Notice: Subject to any disclaimer, the term of this patent is extended or adjusted under 35 U.S.C. 154(b) by 2 days.

(21) Appl. No.: 13/401,722

(22) Filed: Feb. 21, 2012

(65) Prior Publication Data

US 2012/0154124 A1 Jun. 21, 2012

Related U.S. Application Data

(63) Continuation of application No. 12/197,968, filed on Aug. 25, 2008, now Pat. No. 8,123,118, which is a continuation of application No. 11/284,311, filed on Nov. 21, 2005, now Pat. No. 7,416,134, which is a continuation of application No. 10/884,522, filed on Jul. 1, 2004, now Pat. No. 7,309,000.

(60) Provisional application No. 60/484,371, filed on Jul. 2, 2003.

(51) Int. Cl.
  *G06F 17/00* (2006.01)
(52) U.S. Cl.
  USPC .................................. 235/375; 235/492
(58) Field of Classification Search
  USPC ................... 235/492, 375, 380, 451
  See application file for complete search history.

(56) References Cited

U.S. PATENT DOCUMENTS

| | | | |
|---|---|---|---|
| 3,750,167 | A | 7/1973 | Gehman et al. |
| 4,822,990 | A | 4/1989 | Tamada et al. |
| 5,063,507 | A | 11/1991 | Lindsey et al. |
| 5,470,427 | A | 11/1995 | Mikel et al. |
| 5,729,697 | A | 3/1998 | Schkolnick et al. |
| 6,032,127 | A | 2/2000 | Schkolnick et al. |
| 6,208,910 | B1 | 3/2001 | Michael et al. |
| 6,211,781 | B1 | 4/2001 | McDonald |

(Continued)

FOREIGN PATENT DOCUMENTS

| | | |
|---|---|---|
| WO | WO 01/44082 | 6/2001 |
| WO | WO 02/082395 | 10/2002 |

OTHER PUBLICATIONS

Extended European Search Report dated Mar. 5, 2013 for European Patent Application No. 12177498.8.

(Continued)

*Primary Examiner* — Thien M Le
(74) *Attorney, Agent, or Firm* — Knobbe Martens Olson & Bear LLP

(57) ABSTRACT

A system and method of tracking a plurality of items during transfer from a source location to a destination. One embodiment is a method comprising associating information identifying the plurality of items with a radio frequency (RF) tag that identifies a carrier unit. The method further comprises storing said associated information in at least one of the RF tag and a computer memory. The method further comprises communicating with the RF tag to identify the location of the carrier unit. The method further comprises identifying the location of at least one of the plurality of items based at least in part on the location of the carrier unit. Another embodiment is a system configured to perform an embodiment of the method.

20 Claims, 5 Drawing Sheets

(56) References Cited

U.S. PATENT DOCUMENTS

| | | |
|---|---|---|
| 6,480,108 B2 | 11/2002 | McDonald |
| 6,575,358 B2 | 6/2003 | O'Callaghan et al. |
| 6,577,275 B2 | 6/2003 | Turner |
| 6,911,910 B2 | 6/2005 | Sansone et al. |
| 7,482,929 B2 | 1/2009 | Bowers et al. |
| 7,822,624 B2 | 10/2010 | Erdmann et al. |
| 2002/0029151 A1 | 3/2002 | Shofner et al. |
| 2002/0029152 A1 | 3/2002 | Lee et al. |
| 2002/0046111 A1 | 4/2002 | Sumita et al. |
| 2002/0170961 A1 | 11/2002 | Dickson et al. |
| 2002/0174025 A1 | 11/2002 | Hind et al. |
| 2003/0200155 A1 | 10/2003 | Ouchi |
| 2004/0143558 A1 | 7/2004 | Sansone |
| 2005/0004702 A1 | 1/2005 | McDonald |
| 2005/0136949 A1 | 6/2005 | Barnes, Jr. |
| 2006/0071072 A1 | 4/2006 | McDonald |
| 2008/0033738 A1* | 2/2008 | Conard et al. .................. 705/1 |
| 2008/0091460 A1* | 4/2008 | Paul ................................. 705/1 |
| 2008/0308623 A1* | 12/2008 | McDonald ................. 235/375 |
| 2009/0033493 A1 | 2/2009 | Lin et al. |

OTHER PUBLICATIONS

International Search Report and Written Opinion, PCT Application No. PCT/US04/21515, mailed Jan. 26, 2005.

Supplementary European Search Report dated Apr. 24, 2008 for European Patent Application No. 04777562.2.

\* cited by examiner

SYSTEM AND METHOD FOR TRACKING SHIPMENT OF ITEMS UTILIZING RFID-TAGS

CROSS-REFERENCE TO RELATED APPLICATIONS

This application is a continuation of U.S. patent application Ser. No. 12/197,968, filed on Aug. 25, 2008, which is a continuation of U.S. patent application Ser. No. 11/284,311, filed on Nov. 21, 2005, which is a continuation of U.S. patent application Ser. No. 10/884,522, filed Jul. 1, 2004, now U.S. Pat. No. 7,309,000, which claims the benefit of U.S. Provisional Application No. 60/484,371, filed Jul. 2, 2003. Each of the aforementioned applications is incorporated by reference in its entirety.

BACKGROUND OF THE INVENTION

1. Field of the Invention

The present invention relates to systems and methods of materials handling. More particularly, the present invention relates to systems and methods of tracking items such as mail in transit.

2. Description of the Related Art

In a mail service, it is necessary to transport a large number of items. The transportation of those items requires the proper sorting of those item, based on, for example, their destination.

Typically, outgoing mail items are sorted at progressive higher levels of organization. For example, individual letters are generally sorted into a tray holding letters destined for a particular destination city (e.g., Boston). That tray, together with other trays, will be directed to carriers, sometimes referred to as rolling stock. Each carrier holds multiple trays and/or mail sacks and pouches destined for a particular geographic region (e.g., Los Angeles).

The rolling stock will then be utilized to transport multiple trays to a vehicle, to be transported to a mail sorting facility at the intended destination. Ultimately, within the intended destination geographic region, the sorting process will reverse itself. For example, individual mail trays, sacks, and pouches are disaggregated from the rolling stock and routed to their destination locations and individual letters are delivered to their intended recipient.

When shipping large quantities of mail items, it is desirable to accurately track shipments. In this regard, it is desirable to track trays as they are transported from an origin to a destination. It is further desirable to track the weight of shipped mail items and the use of rolling stock capacity, for purposes of being able to increasing the efficiency of the overall transporting process. Thus, a need exists for improved methods of tracking shipments.

SUMMARY OF CERTAIN EMBODIMENTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include, for example, providing a method for tracking items during transit.

One embodiment is a method of tracking a plurality of items during transfer from a source location to a destination. The method comprises associating information identifying the plurality of items with a radio frequency (RF) tag that identifies a carrier unit. The method further comprises storing said associated information in at least one of the RF tag and a computer memory. The method further comprises communicating with the RF tag to identify the location of the carrier unit. The method further comprises identifying the location of at least one of the plurality of items based at least in part on the location of the carrier unit.

Another embodiment is a system for tracking a plurality of items during transfer from a source location to a destination. The system comprises a carrier unit configured to transport the plurality of items. The system further comprises an RF tag coupled to the carrier unit. The RF tag is configured to store information associated with each of the plurality of items. The system further comprises a processing station in communication with the RF tag. The processing station is configured to identify the location of at least one of the plurality of items based at least in part on the location of the carrier unit.

Another embodiment is a method of tracking utilization of a plurality of items. The method comprises receiving data indicative of the occupancy level of the plurality of items, each being designated to a transport unit. The method further comprises determining the occupancy level of the transport unit based, at least in part, on the occupancy level of the plurality of the items. The method further comprises providing data indicative of the space available in the transport unit. The method further comprises determining data indicative of the efficiency of utilizing the transport unit based, at least in part, on the occupancy level of the transport unit.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

As used herein, mail units are groups of mail items destined for a common destination, for example, a particular city. Items are typically transported in a container, or tray. To enable tracking of the progress of the trays and, e.g., easily identify the destination of the trays, trays typically receive labels that have printed thereon bar codes and human readable text. It is to be appreciated that while certain embodiments are discussed herein with respect to a tray, the term "tray," as used herein, is intended to include any unit container of mail, including a tray, a sack, or a pouch.

Figure 1:
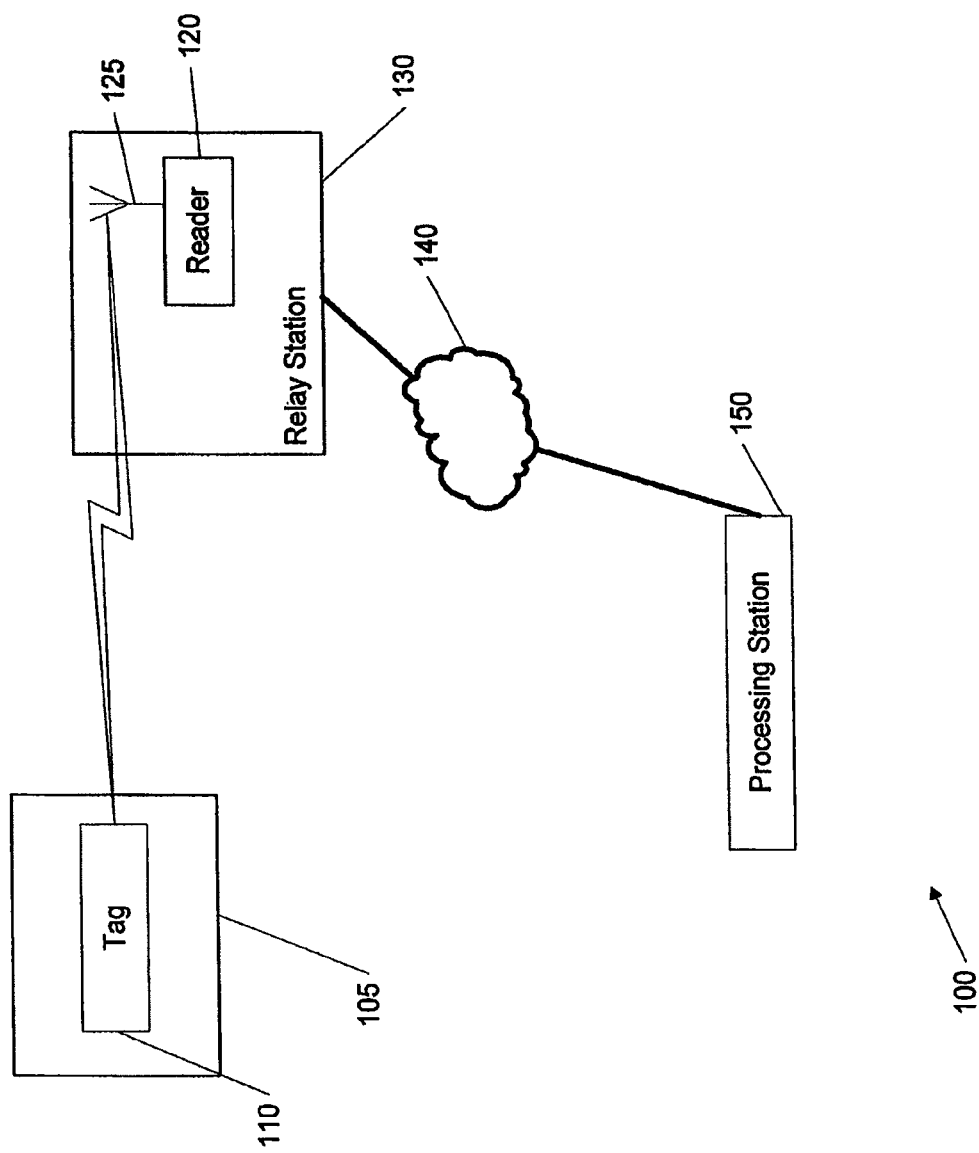
FIG. 1 is a block diagram depicting one embodiment of a system for tracking the location of an item.

FIG. 1 is a block diagram depicting one embodiment of a system 100 for tracking the location of an item, such as a tray 105. In one embodiment, the tray may be configured to store letters or flat mail. The tray may comprise a substantially rigid material, e.g., fiber board. In another embodiment, the tray may comprise a flexible container such as a nylon pouch. An RFID tag 110 is affixed to the tray 105. The RFID tag 110 is in wireless communication with the RFID reader 120. The reader 120 is coupled to a relay station 130, which relays data through a data network 140 to a processing station 150. The reader 120 is configured to send an interrogation signal, which when received, causes the tag 110 to respond by transmitting an identification signal. The identification signal comprises an identification number associated with the tag 110. Typically, this identification number is unique to the tag 110. This identification number is sometimes referred to as a "license plate number."

The RFID tag 110 may be active or passive. Passive tags typically comprise a transistor, antenna, and a coil. In one embodiment, the TAG 110 comprises an integrated circuit. Passive tags are powered by the transmitted interrogation signal of the reader 120. The passive tag 110 may comprise a backscatter tag. In one embodiment, the backscatter tag 110 transmits its signal by using the transistor to amplitude modulate the carrier signal that is received by the coil. In an alternative embodiment, the RFID tag 110 may comprise microscopic size particles or structures that passively reflect electromagnetic energy in a unique and quantifiable manner in response to an interrogation signal received by the antenna. Such embodiments comprise chipless devices, e.g., including neither an integrated circuit nor discrete electronic components such as the transistor or coil. One such embodiment of an RFID tag 110 comprises devices manufactured by Inkode USA of Vienna, Va. In another embodiment, the RFID tag 110 may comprise a device operating on surface acoustic wave principles.

Active tags typically comprise a transistor, coil, antenna, and battery. In addition to providing more power for use in transmitting, active tags may support encrypted responses. In one embodiment, active tags 110 may also respond to particular interrogation signals by storing or retrieving data from a memory.

In one embodiment, the RFID tag 110 is associated with the tray 105 by applying label stock that is advantageously embedded with RFID tags. The identifier of the RFID 110 confers upon each label so constructed a unique identification number. In one embodiment, the RFID tag 110 comprises a passive, read-only tag. In one embodiment, it is desirable to configure the RFID tag 110 with a short read range, for example, in the range of about 5 feet. In other embodiments, the tag 110 may have a range of 1, 2, 3, 4, 6, 7, 8, 9, or feet. In other embodiments, the tag 110 may have a range of over 10 feet. An advantage of a short read range is that it prevents the unintended reading of other labels in a processing facility.

There are a number of advantages to utilizing RFID tags 110 over bar codes within labels. The RFID tag 110 may be "read" even where the label is not visible, and thus can be read through containers made of corrugated fiberboard, canvas, or nylon, or other light obstructive material. The RFID tag 110 also does not need to be oriented in a particular direction for reading.

The label stock may comprise discrete sheets of labels, or, preferably, continuous feed type label stock. The label stock may comprise a plastic or paperboard material. The RFID tag 110 may either be affixed to, or embedded within the tray label stock. In one embodiment, the tag 110 is incorporated into the material of the tag during manufacturing.

A plurality of readers 120 may be placed at different locations in the processing facility such that approximate location of the tag 110 may be determined by which reader or readers 120 receive the identification signal from the tag 110. While one reader 120 is depicted in the embodiment depicted in FIG. 1, it is to be appreciated that embodiments of the system 100 may comprise sets of readers 120 including from one to hundreds of readers. Exemplary embodiments of such networks of readers 120 for tracking an article using RFID tags are discussed in more detail in U.S. Pat. No. 6,211,781, entitled "METHOD AND APPARATUS FOR TRACKING AND LOCATING A MOVEABLE ARTICLE," issued on Apr. 3, 2001, and U.S. Pat. No. 6,480,108, also entitled "METHOD AND APPARATUS FOR TRACKING AND LOCATING A MOVEABLE ARTICLE," issued on Nov. 12, 2002, each of which is incorporated by reference in its entirety.

In one embodiment, the processing station 150 may comprise a computer (e.g., a server) configured to run a software sorting module to direct the printing of the labels to be placed on the trays 105. In another embodiment, standalone processor may execute the sorting module and communicate with the processing station 150. The sorting module associates each label with a destination (such as a city name, zip code, or other geographical unit). In a processing facility, the destination may correspond to a cell or stacker machine. The destination of the tray 105 and the identifier of the tag 110 are recorded proximate to printing the label. The destination and other information associated with the label may be communicated to the processing station 150. In one embodiment, human readable text is also placed on the label. In addition, a bar code may also be placed on the label.

In one embodiment, the RFID tag 110 affixed to the label comprises a backscatter RFID tag. For example, the RFID tag 110 may comprise reflective aluminum silica crystal, which are stable when stored for long periods of time and have a sufficiently low cost so as to be used in consumable, single-use labels, such as mail tray labels. It is to be appreciated, however, that any type of RFID tag 110 may be affixed to the label. Moreover, in one embodiment, the RFID tag 110 may be embedded in the tray 105. The sort program may control a label printer for printing information on the labels. The printer may be attached to the reader 120. The tag reader 120 receives the identifier of the tag 110 in the blank label. The sort program relates the identifier of the tag 110 to a destination assigned by a sort plan. The assigned destination may include a corresponding mail bin or stacker.

The reader 120 generally comprises an antenna and a receiver circuit tuned to receive the information transmitted by the tag 110. In one embodiment, the reader 120 comprises a transmitter configured to transmit an interrogation signal. Upon receiving the interrogation signal, the RFID tag 110 generally responds with its identification signal. As noted above, an exemplary embodiment of the reader 120 may be obtained from Inkode USA. The reader 120 may generate the interrogation signal such that it includes sufficient power or other signal characteristics for powering or activating any of the embodiments of passive or active tags described herein. The reader 120 may also transmit commands or additional data to the tag 110 in the interrogation signal. Active RFID tags 110 may respond to such commands by storing the additional data, e.g., the tray weight or destination, within an associated memory. The reader 120 may transmit a corresponding command to signal the active tag 110 to transmit the additional data from its associated memory to the reader 120.

In one embodiment, the relay station 130 may comprise the reader 120, an antenna 125, and a network interface configured to communicate with the network 140. The relay station 130 relays information from the tag reader 120 to the network 140. The relay station 130 may also communicate commands received from the network 140 to the reader 120. In one embodiment, the reader 120 and the relay station 130 may be an integrated device. In another embodiment, the reader 120 may be in data communication with the relay station 130 using a peripheral connection interface, such as a serial port, a parallel port, Universal Serial Bus (USB), or any other similar wired/wireless data interface. In one embodiment, the relay station 130 may comprise a mobile computing device, e.g., a personal digital assistant (PDA).

The network 140 may comprise wired or wireless networks, for example, one or more of the following networks: the Internet, Intranets, Local Area Networks (LAN), or Wide Area Networks (WAN). In addition, the connectivity to the network 140 may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1).

The processing station 150 may comprise a processor and a network interface for coupling the station 150 to the network 140. The processing station 150 may also comprise a storage medium (not shown), e.g., a memory or a disk drive. In one embodiment, the processor may be embedded or a part of a computer (e.g., a server) that interfaces with the network 140. The processing station 150 may also comprise software modules run on the process to provide storage and control functions to the system 100. For example, the software modules may include a database module configured to store data on the storage medium. This database module may be accessible to components (not shown) for viewing or generating reports describing the data in the storage medium. Such data may include the identifiers of tags 110 and other information associated with each tag 110, including the destination of the tray 105 carrying the tag.

In one embodiment, the database module is configured to store information associated with the tag, including: information about the type of container on which the tag 110 is affixed, the class of mail therein contained, the label creation date, and a label expiration date. The particular length of the expiration period may be varied as desired, and may be related to the expected period of time that the tray 105 is expected to be in the mailstream. In one embodiment, this period of time may vary relative to the respective class of the mail.

In one embodiment, the software modules comprise a decision module configured to determine the presence or absence of stale mail based at least partly on information provided by the database module. Stale mail comprises mail that remains within the postal system after its scheduled delivery date, or expected time in the mailstream. By associating an expiry date with a tag 110, stale mail may be identified when a reader 120 reads the tag 110 after that date. Once identified, the stale mail may receive priority processing to expedite delivery and to thus minimize further delays.

Figure 2C:
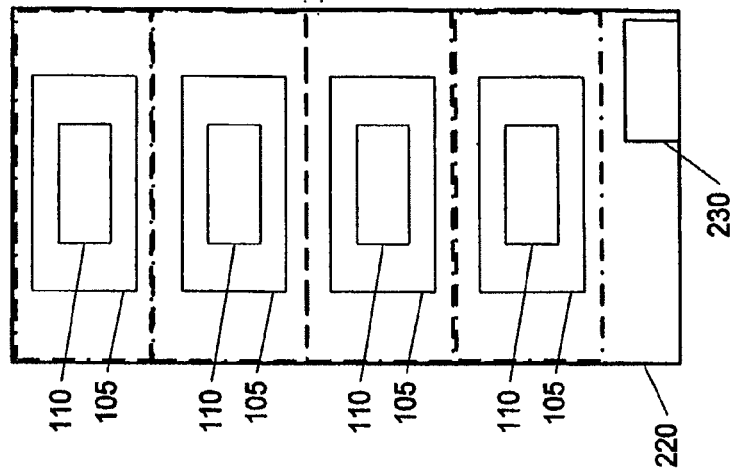
FIG. 2c is a functional block diagram of the exemplary multiple tray carrier of FIG. 2b having the trays of FIG. 2a loaded thereon.
Figure 2B:
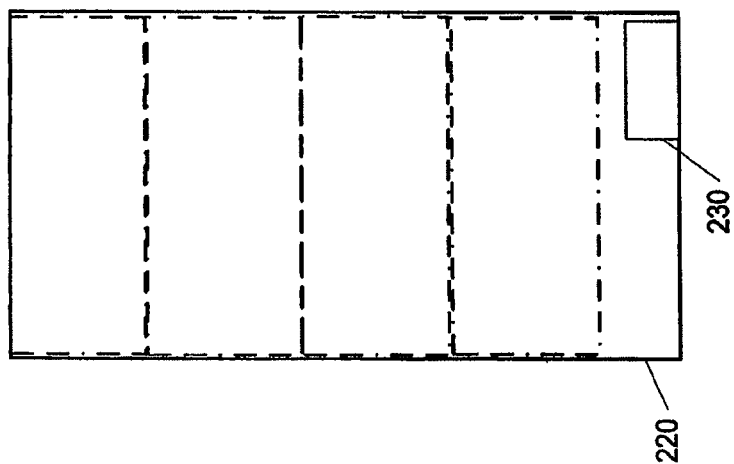
FIG. 2b is a functional block diagram of an exemplary multiple tray carrier.
Figure 2A:
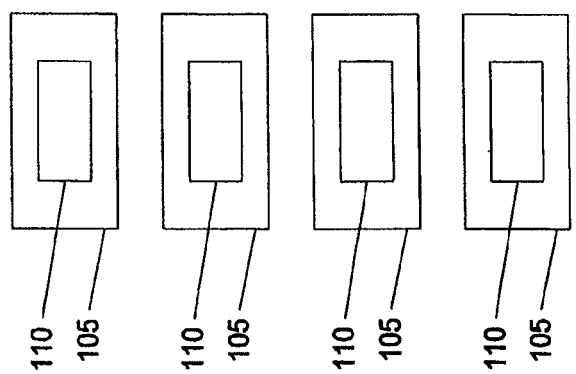
FIG. 2a is a functional block diagram of a plurality of trays such as the tray of FIG. 1.

FIG. 2a is a functional block diagram depicting a plurality of trays 105 such as the tray 105 of FIG. 1. It is to be appreciated that FIG. 2a depicts a functional representation of the tray 105 and does not depict or restrict the physical characteristics of the tray 105 or any other component. At the end of the conveyor line in the processing facility, the trays destined for a particular geographic unit, e.g., a city, zip code, or carrier route, are moved onto a multiple tray carrier. Multiple tray carriers typically comprise wheels, and are thus commonly referred to in the collective as rolling stock.

FIG. 2b is a functional block diagram of an exemplary multiple tray carrier 220. It is to be appreciated that FIG. 2b depicts a functional representation of the multiple tray carrier 220 and does not depict or restrict the physical characteristics of the multiple tray carrier 220 or any other component. The multiple tray carrier 220 comprises an RFID tag 230 and is configured to hold a plurality of the trays 105. In one embodiment, the multiple tray carrier 220 comprises the RFID tag 230, a support frame, shelves that are configured to hold the tray 150, and wheels. Multiple tray carriers 220 are commonly referred to collectively as rolling stock.

In one embodiment, the carrier tag 230 comprises an active RFID tag that is configured to store or identify information, e.g., the identifier of the tag 110 of each tray 105 carried by the multiple tray carrier 220. However, in another embodiment, the carrier tag 230 may comprise both a passive RFID tag and an active RFID tag. The passive tag may, for example, identify the multiple tray carrier 220, while the active tag may, for example, store the identifiers of the tags 110 of trays loaded onto the multiple tray carrier 220. In one embodiment, the active tag 230 also has a substantially longer read range than the passive tags 110 in the labels of the tray 105. One embodiment of the active carrier tag 230 comprises devices manufactured by ID Systems, Inc, such as the Flextag™ system. In another embodiment, the carrier tag 230 comprises a passive tag. Moreover, embodiments of the carrier tag 230 may comprise any of the types of devices described above with respect to the tag 110.

As discussed with reference to FIG. 1, in one embodiment, the reader 120 transmits data (e.g., the identity or weight of the trays 105 loaded onto the carrier 220) to the active tag 230 for storage. In one embodiment, the reader 120 transmits the data to the tag 230 along with a command in the interrogation signal directing the tag 230 to store the data. The relay station 130 may transmit the data from the processing station 150 to the reader 120.

FIG. 2c is a functional block diagram of the exemplary multiple tray carrier 220 of FIG. 2b having the trays 105 of FIG. 2a loaded thereon. It is to be appreciated that FIG. 2c depicts a functional representation of the multiple tray carrier 220 and its functional association with the tray 105 and does not depict or restrict the physical characteristics or relationship of any components. The plurality of trays 105 on the multiple tray carrier 220 may thus be collectively tracked during transport via the RFID tag 230. In one embodiment, the multiple tray carrier 220 has sufficient capacity to load approximately forty (40) trays. This advantageously reduces the total number of items that are tracked. Further, in one embodiment, lower cost passive RFID tags are advantageously used to track the items that are tracked in larger numbers, e.g., the tray 105, while active tags are used for items that are tracked in smaller numbers, e.g., the multiple tray carriers. For example, using such an embodiment, a worker or machine in the field may read characteristics relating to the collection of trays, e.g., their weight, from the active RFID tag 230 without need for that worker or machine to be in communication with the processing station 150.

Figure 3:
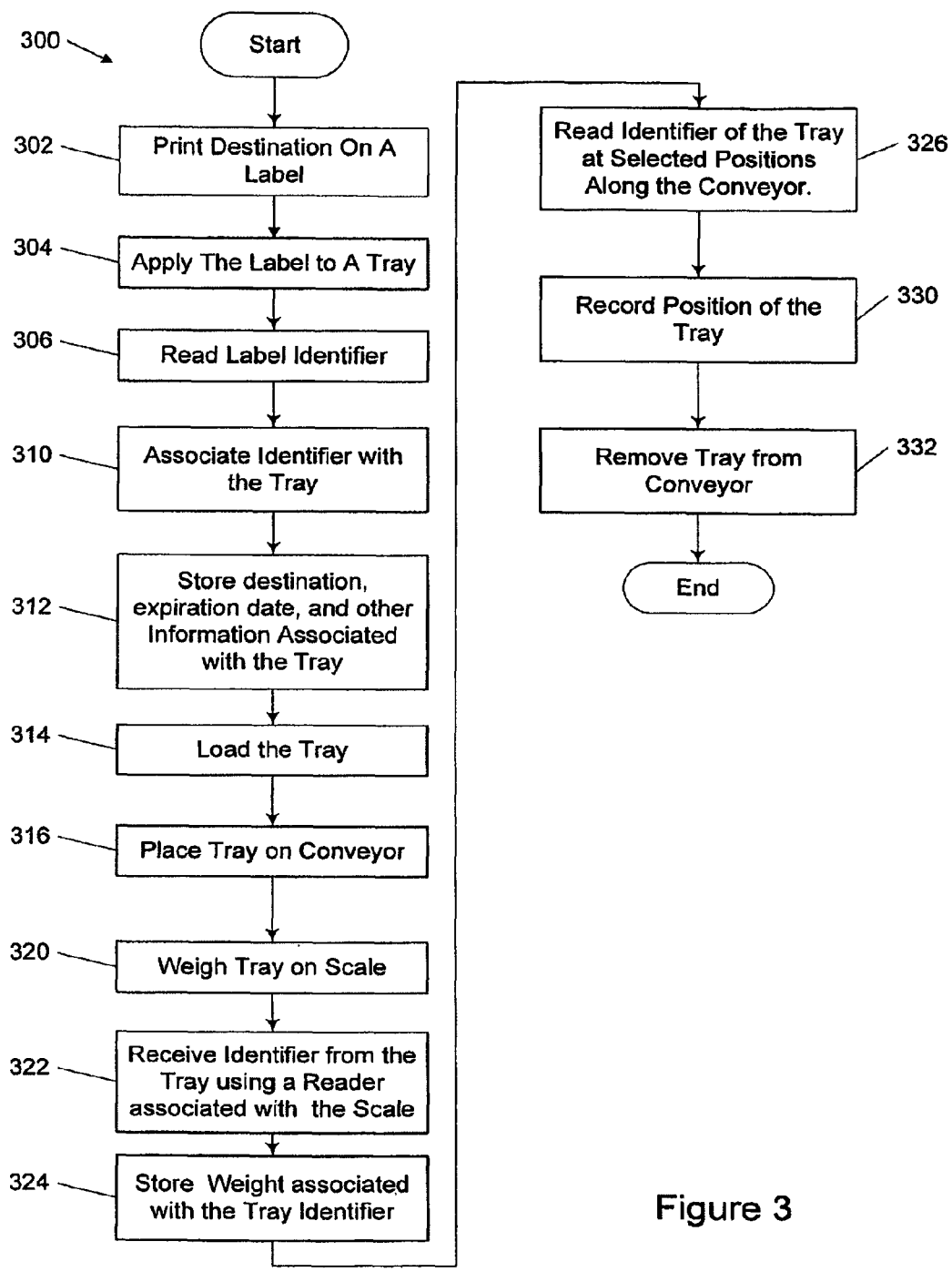
FIG. 3 is a flow chart illustrating one embodiment of a method of tracking the location of an item using, for example, the system depicted in FIG. 1.

FIG. 3 is a flow chart illustrating one embodiment of a method 300 of tracking the location of an item using, for example, the system depicted in FIG. 1. The method 300 begins at step 302 where a label, including or otherwise coupled to the tag 110, is printed. Next at step 304, the label is applied to the tray 105. Moving to step 306, the reader 120 receives the identifying signal of the label tag 110. Next at step 310, the sorting module associates the tray 105 with the identifier. The sorting module also transmits the identifier of the tag 110 and information relating to the tray 105, such as its destination, to the database module of the processing station 150. Proceeding to step 312, the database module stores the destination, expiration date, and other information associated with the tray 105.

Next at step 314, the tray 105 is loaded with, for example, mail items. As discussed above, information associated with the mail items, e.g., the class of the mail may be associated with the tag 110 by the database module. Moving to step 316, the tray 105 continues through the tray transportation/sorting process by, typically, placing the tray 105 onto a conveyer belt of some type. The conveyer belt may comprise, for example, a powered roller line or other mechanized take-away line. The conveyer moves the tray 105 through a processing facility for sorting and distribution. In some instances, the conveyer apparatus has multiple exits, and includes diverters or the like to permit the directing of trays to different run-outs, or exit points.

Moving to step 320, a scale weighs the tray 105. In one embodiment, the conveyer moves the tray 105 over an in-line scale to weigh the tray 105. Next at step 322, the reader 120 associated with the scale reads the identification of the tag 110 of the tray 105 on the scale and sends the identifier to the processing station 150. The scale may communicate the weight to the processing station 150 directly, or to the relay station 130 associated with the reader 120. Proceeding to step 324, the processing station 150 stores the weight of the tray 105 in association with the identifier of the tag 110 on the tray 105. The tray 105 may be weighed at any point along the processing line, depending, for example, on when in the processing steps the particular processing line makes reference to the weight.

Moving to step 326, the reader 120 receives the identifier of the tray 105. In one embodiment, one or more readers 120 are positioned at selected positions along one or more conveyers. The short read range of passive tags 110 may be exploited to determine the proximate location of the tag 110 and its attached tray. In one embodiment, the location is determined based at least partly on which of the readers 120 receive a signal from the tag at a given time. In another embodiment, the location is determined at least partly based on the timing of receipt of the signal by each of the readers 120. The antennae of the readers 120 may be positioned, for example, above or below the conveyer. The reader 120 may be directly coupled to its antenna, or the antenna may be placed at a different location than the reader and attached by any desired link to its antenna. As discussed above, each reader 120 is in communication with the processing station 150 via the relay station 130 and the network 140.

Next at step 330, the position of the tray 105 is stored on the processing station 150. The approximation of the position may be based on the location of the reader 120 receiving the identifier of the tag 110, or on a calculation based on the position two or more readers 120 that receive the identification signal from the tag 110. Other methods known in the art of locating an RF-transmitting item or object may also be used, such as those discussed in the previously incorporated U.S. Pat. No. 6,480,108, entitled "METHOD AND APPARATUS FOR TRACKING AND LOCATING A MOVEABLE ARTICLE." It is to be appreciated that steps 326 and 330 may be performed at any number of selected locations within a sorting or other transit facility. For example, trays 105 may be tracked before or after transfer points or sorting stations along the conveyer belt to confirm that the trays 105 are being transported to the correct destination.

Finally, at a step 332, when, for example, the tray 105 reaches an endpoint of the conveyer, the tray 105 is removed from the conveyer for further processing. In particular, the tray 105 may be placed onto the multi-tray carrier 220 for further processing as described below with reference to FIG. 4.

It is to be appreciated that depending on the embodiment, the acts or events of the method 300, and all other methods described herein, may be performed in any sequence, may be added, may be merged, or may be left out all together (e.g., not all acts or events are necessary for the practice of the method) unless specifically and clearly stated otherwise. Moreover, unless clearly stated otherwise, acts or events may be performed concurrently rather than sequentially.

Figure 4:
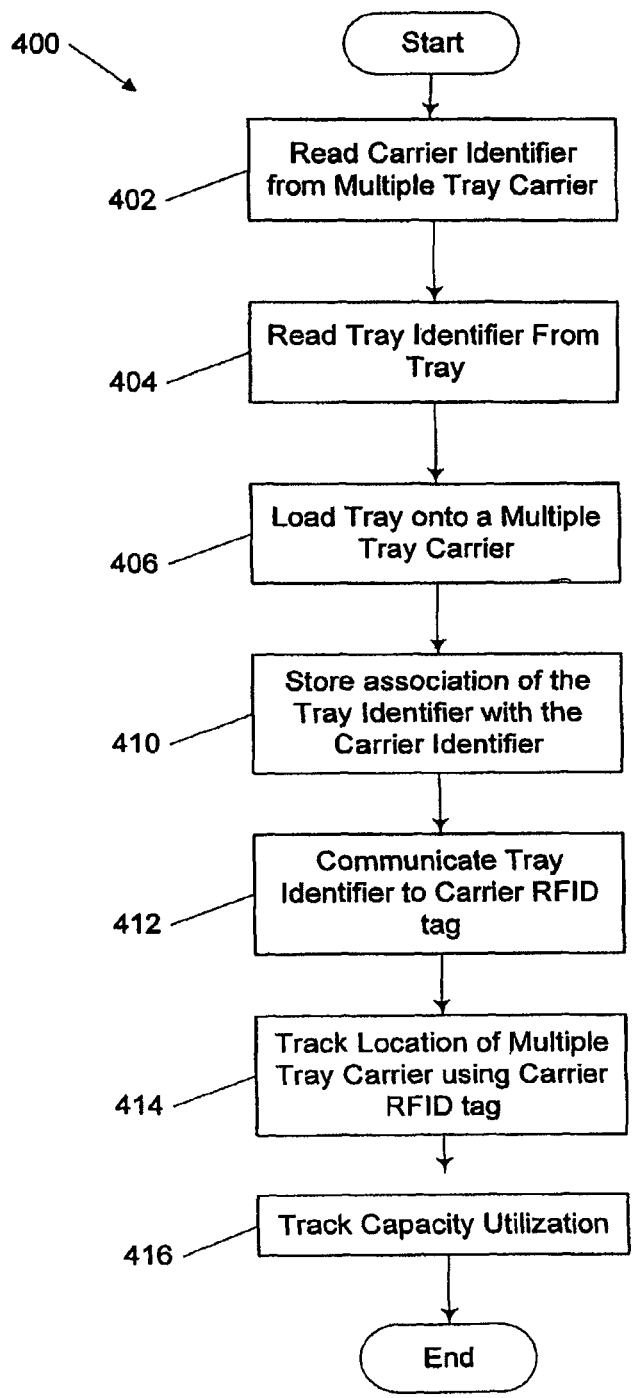
FIG. 4 is a flow chart illustrating one embodiment of a method of tracking the multiple tray carrier of FIG. 2c.

FIG. 4 is a flow chart illustrating one embodiment of a method 400 of tracking the multiple tray carrier of FIG. 2c. In one embodiment, the method 400 of FIG. 4 follows or continues from the method 300 of FIG. 3. Beginning at step 402, the reader 120 reads the identifier of the RFID tag 230 of the multi tray carrier 220 and communicates this identifier to the processing station 150. The multi tray carrier 220 is typically located at conveyer exit points, where trays are typically removed from the conveyer and loaded into the multiple tray carrier 220. As noted above, each multiple tray carrier 220 holds multiple trays 105 destined for a particular destination, such as Southern California or a particular post office. In one embodiment, a human or robotic mover moves the trays 105 from the conveyor to the carrier 220. In order to identify to the mover which carrier 220 the mover is placing the tray on, the mover may also receive the identifier of the carrier 220, e.g., from the reader 120. The robotic mover may include or have access to a memory to store this identifier. In another embodiment, a human user may receive and store the identifier in an electronic device that is in communication with the reader 120.

Next at step 404, the human or robotic mover reads the tray identifier from the tray 105. In one embodiment, the mover uses a bar code reader to receive the identifier of the tray 105 from the label. In another embodiment, the RFID reader 120 is located so as to receive only the identifier of the RFID tag 110 for the particular tray 105 to be loaded. In one embodiment, the bar code reader or the RFID tag reader 120 sends the identifier to the processing station 150. As each tray 105 is received by the mover for loading, the bar code reader or the RFID tag reader 120 may also transmit the identifier of the tray 105 to the mover. The mover for tray 105 may store the identifier of the tray 105. In one embodiment, the mover may associate the identifier of the tray 105 with the identifier of the carrier 220 and send this information to the processing station 150. In another embodiment, the processing station 150 may be configured to recognize this relationship automatically by matching the location of the tray 105 as it reaches the end of the conveyer with the location of the multi tray carrier 220. The processing station 150 may determine the location of each of the tray 105 and the carrier 220 by determining the position of the respective RFID tags 110 and 230.

Next at step 406, the mover loads the tray 105 onto the multi tray carrier 220. The mover may communicate to the processing station 150 that the tray 105 has been loaded. Moving to step 410, the processing station 150 stores the identifier of the tray 105 and the identifier of the multi tray carrier 220 so as to associate the tray 105 with the carrier 220. In one embodiment, the storage medium stores the identifiers of the trays 105 and identifiers of the multi tray carriers 220 in a table or other data structure that associates each of the trays 105 with the respective multi tray carrier 220 onto which each tray 105 is loaded. The processing station 150 may also store additional information relating to the carrier 220. For each carrier 220, this information may include, for example, whether the carrier 220 is loaded with a tray 105 of a particular type, whether the carrier 220 is loaded with trays 105 containing one or mixed classes of mail, the weight and volume occupied within each tray 105, the total weight and volume occupied within the trays 105 loaded onto the carrier, a capacity utilization of the carrier 220, and an intended destination of each tray 105. The capacity utilization of the carrier 220 may be expressed as or characterized by a capacity utilization in a cubic unit of measurement (e.g., cubic feet), e.g., the total volume occupied within the trays 105 loaded on the carrier 220 divided by the total volume capacity of the trays 105 loaded onto the carrier 220. In one embodiment, the database module of the processing station 150 communicates this data to the storage medium.

Next at step 412, the processing station 150 communicates the identifier of the tray 105 to the reader 120. The reader 120 then transmits the identifier to the RFID tag 230 of the carrier 220, which stores this data. In another embodiment, the mover communicates the identifier of the tray 105 to the reader 120 which then sends this identifier to the RFID tag 230 of the carrier 220. In yet another embodiment, the reader 120 that receives the identifier of the tag 110 communicates the identifier of the tray 105 directly to the carrier tag 230. In another embodiment, the identifier of the tray 105 is not stored on the carrier tag 230, but is merely communicated to the processing station 150, which stores this information. In such an embodiment, the carrier tag 230 may comprise a passive tag.

The carrier tag 230 stores the identifier of the tray 105 into its attached memory. In addition, the processing station 150, through reader 120, may also communicate other information to the tag 230 for storage. This other information may include, for example, whether the carrier 220 is loaded with a container of a particular type, whether the carrier 220 is loaded with trays containing one or mixed classes of mail, the weight and capacity volume of each tray, the total weight and volume of trays loaded onto the carrier, a capacity utilization of the carrier 220, and an intended destination of each tray.

With such embodiments, it will be appreciated that tracking each of the plurality of trays 105 on the multi-tray carrier 220 is reduced to tracking the single multi-tray carrier 220. This desirably reduces the complexity and quantity of items in the tracking process. Further, in an embodiment in which the multi-tray carrier 220 comprises the active RFID 230, additional information, such as the weight or destination of the trays, may be stored with the carrier 220. This enables any worker or robot with an embodiment of the reader 120, such as a handheld reader, to easily determine, for example, the weight of the trays on the carrier 220, even when the worker or robot is not in communication with the processing station 150. Thus, a delivery worker in the field can easily determine information relating to a carrier 220 without relying on a printed label, which may not be visible, e.g., when loaded on a vehicle.

Proceeding to step 414, the reader 120 may periodically receive and communicate the tag 230 of the rolling stock 220 to the processing station 150 to track its progress through the system, avoid misrouting of stock, and the like. Preferably, tags 230 support radiolocation schemes such as TDMA and/or CSMA to determine the physical locations of such RFID tagged rolling stock 220 to help prevent it from being misplaced and/or lost among a multiplicity of identical pieces of rolling stock 220. Tag readers 120 for rolling stock 220 may be positioned high on walls, within or above doorways through which rolling stock passes, at loading docks, at vehicle entrances, or at other locations. Mobile tag readers 120, for example handheld units, may also be utilized.

Moving to step 416, the processing station 150 may track the capacity utilization of each multi tray carrier 220. In addition, as the carriers 220 are loaded onto mail transport equipment (MTE), e.g., trucks, for transport, the processing station 150 may track the capacity utilization of the MTE. In one embodiment, software modules executing on the processing station 150 may use the information in the storage medium relating to the carriers 220 to produce various calculations of capacity utilization data. Capacity utilization data may include data representing the occupied and remaining storage capacity for the trays 105, containers 220, or MTE. Capacity utilization may be calculated in terms of weight, volume occupied, or both. In one embodiment, determining capacity utilization of a carrier comprises dividing the number of trays 105 loaded onto each carrier 220 by the capacity of the carrier 220 in terms of the number of trays 105. In another embodiment, the capacity utilization of a carrier 220 may be expressed as or characterized by a weighted average of the capacity utilization of each tray 105 loaded onto the carrier divided by the total volume capacity of the carrier 220. In one embodiment, the capacity utilization of the MTE may be expressed as or characterized by, for example, the weighted average of the volume capacity utilization of each carrier 220 that is loaded onto the MTE divided by the total carrier volume capacity of the MTE.

The processing station 150 may store the capacity utilization data to track the utilization of particular MTEs. Software modules may read, collate, aggregate, or report the capacity utilization data. A planner, either a human or a software module, may use this stored capacity information to identify under-utilized MTE. For example, in one embodiment, the capacity utilization data may identify for the planner that the MTE for a particular destination have low capacity utilization because the trays 105 are individually under-utilized in terms of volume occupied. The planner may then further utilize tracking of such capacity data to identify adjustments in the processing of the trays 105 to increase capacity utilization of the trays 105. The planner may similarly utilize capacity utilization data, e.g., in terms of number of trays 105 per carrier 220, to reduce the number of carriers 220 for particular destinations. Further, the planner may use MTE capacity utilization data in terms of number of carriers per MTE to adjust the size of MTE, e.g., truck, assigned to particular destinations or specific trips to improve MTE efficiency.

Figure 5:
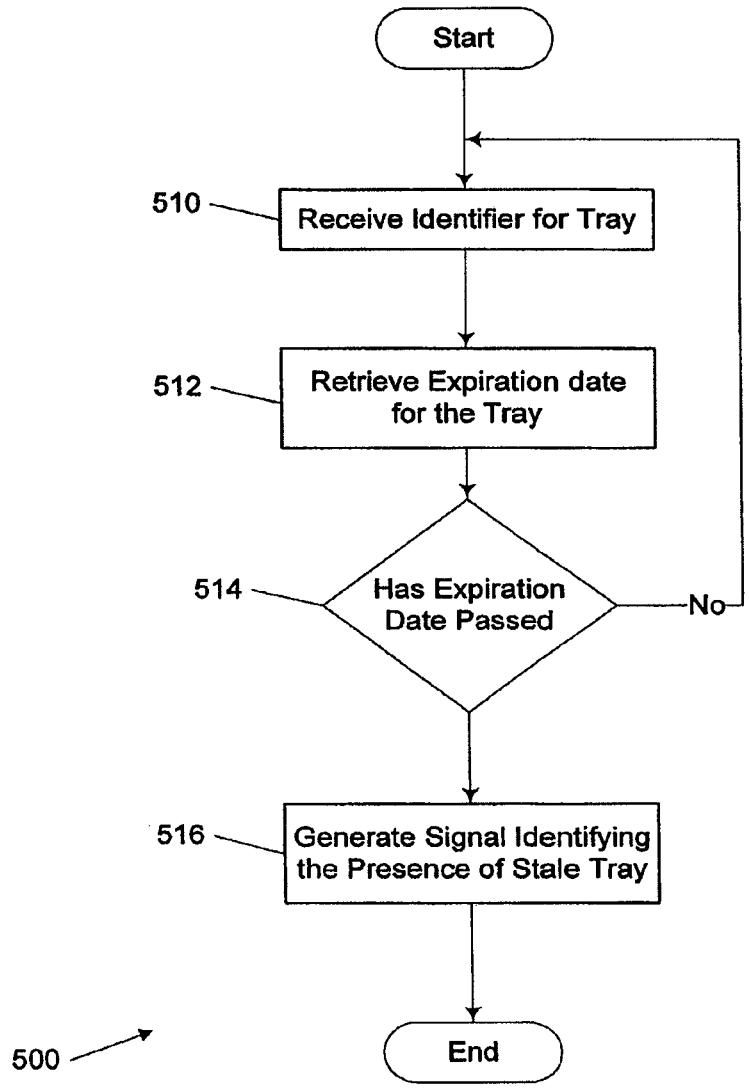
FIG. 5 is a flow chart illustrating one embodiment of a method of identifying stale mail using, for example, the system depicted in FIG. 1.

FIG. 5 is a flow chart illustrating one embodiment of a method 500 of identifying stale shipments using, for example, the system depicted in FIG. 1. The method 500 begins at step 510, in which the processing station 150 receives the identifier for a tray. Moving to step 512, a software module associated with the processing station 150, retrieves the expiration date for the tray 105. Proceeding to step 514, the software module compares the expiration date to a processing date, e.g., the current date or a future date of, e.g., 1-3 days after the current date, to determine if the expiration date has passed. If the expiration date has not passed, the method 500 returns to the step 510 to process the next tray in the system. If the date has passed, then the method 500 proceeds to step 516. Next at step 516, the processing station 150 generates a signal identifying that the tray 105 is stale. In one embodiment, the processing station 150 transmits the signal to an indicator device that directs a person to the carrier 220 that contains the stale tray and to remove the stale tray to expedited processing. In another embodiment, the signal is directed to a sorting module that directs the stale tray appropriately, e.g., for expedited processing. In yet another embodiment, the processing station 150 directs the signal to a software module within the processing station 150. The software module may tracks and direct processing of the stale tray. It is to be appreciated that while the method 500 is discussed with respect to the tray 105, corresponding processing may also be performed with respect to the multiple tray carrier 220.

Other embodiments of the systems and methods described herein may be employed to reduce the complexity and quantity of mail items other than trays 105. For example, in one embodiment, rather than tracking trays 105 with RFID tags, individual items of mail that comprise unique identifiers may also be tracked by tracking a carrier 230 that is loaded with a plurality of these items. For example, express mail items have unique identifiers in the form of bar codes. Rather than needing to read the bar codes of each of a plurality of express mail at each and every location where tracking of the express mail items is desired, the individual express mail items may be loaded onto a carrier unit identified by a tag 220. Thus, the location the express mail items may be identified based on the location of the easier to track carrier unit.

While the methods and system as described herein may be utilized, in one preferred embodiment, in the transportation and sorting of mail items, the systems and methods may also be utilized for the transportation and sorting of other items where efficient and accurate transportation and life cycle information is required. For example, military equipment, such as artillery projectiles, ammunition containers, propellant charges and containers for propellant charges, fuzes, and the like may be tracked during transport and storage. In such an embodiment, the identifier of the tag 110 may be associated with information that forms a birth to death data base record for individual artillery munitions. This record may include such artillery ammunition life cycle events as projectile type (high explosive (HE), smoke, illuminating), model (155 mm HE M107 vs. M795) number, production facility, production date and lot number, weight stamp code, packing date, packing mode (rack of three versus crate of two), repack date, and other data elements.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for tracking transport of at least one item, the system comprising:
   a tray comprising:
      a storage portion configured to receive an item; and
      a first wireless tag that identifies the tray, wherein the first wireless tag is configured to transmit a first signal in response to a received interrogation signal;
   a tray carrier comprising:
      a holding portion configured to hold the tray; and
      a second wireless tag that identifies the tray carrier, wherein the second wireless tag is configured to transmit a second signal in response to a received interrogation signal;
   a reader configured to receive identification information from the tray and the tray carrier, wherein the reader is configured to transmit an interrogation signal and to receive the first signal from the first wireless tag and the second signal from the second wireless tags and
   a processing station configured to associate data relating to the tray with the first received signal and to associate data relating to the tray carrier with the second received signal.

2. The system of claim 1, wherein the first wireless tag comprises a first RFID tag.

3. The system of claim 2, wherein the first RFID tag comprises a passive tag.

4. The system of claim 2, wherein the first RFID tag comprises an active tag.

5. The system of claim 4, wherein the first RFID tag further comprises memory.

6. The system of claim 1, wherein the second wireless tag comprises a second RFID tag.

7. The system of claim 6, wherein the second RFID tag comprises a passive tag.

8. The system of claim 6, wherein the second RFID tag comprises an active tag.

9. The system of claim 8, wherein the second RFID tag further comprises memory.

10. The system of claim 1, wherein the reader communicates with the processing station via a relay.

11. The system of claim 10, wherein the relay wirelessly transmits information received from the reader to the processing station.

12. A method of tracking transport of at least one item, the method comprising:
   placing an item in a tray;
   attaching a wireless tag to the tray, wherein the wireless tag is configured to transmit a signal in response to a received interrogation signal;
   receiving a first signal from the wireless tag at a first reader in response to a first interrogation signal;
   associating the received signal with a tray characteristic;
   receiving a second signal from the wireless tag at a second reader in response to a second interrogation signal;
   receiving the second signal from the wireless tag at a third reader in response to the second interrogation signal; and
   determining the location of the tray based on parameters associated with the second and third readers.

13. The method of claim 12, wherein the wireless tag comprises a RFID tag.

14. The method of claim 13, wherein the RFID tag comprises a passive tag.

15. The method of claim 13, wherein the RFID tag comprises an active tag.

16. The method of claim 15, wherein information relating to the tray characteristic is transmitted to the RFID tag.

17. The method of claim 12, wherein a processing station associates the received signal with the tray characteristic.

18. The method of claim 12, wherein at least one of the first reader, the second reader, and the third reader communicates with the processing station.

19. The method of claim 12, wherein the second signal is not received by a fourth reader.

20. The method of claim 19, wherein determining the location of the tray is further based on parameters associated with readers that did not receive the second signal.

\* \* \* \* \*